United States Patent
Hoffmeister

(10) Patent No.: US 12,179,928 B2
(45) Date of Patent: Dec. 31, 2024

(54) AIRCRAFT WITH ARM HAVING EIGENMODES IN DISJUNCT FREQUENCY RANGES

(71) Applicant: Dr. Ing. h.c. F. Porsche Aktiengesellschaft, Stuttgart (DE)

(72) Inventor: Martin Hoffmeister, Stuttgart (DE)

(73) Assignee: DR. ING. H.C. F. PORSCHE AKTIENGESELLSCHAFT, Stuttgart (DE)

(*) Notice: Subject to any disclaimer, the term of this patent is extended or adjusted under 35 U.S.C. 154(b) by 469 days.

(21) Appl. No.: 17/216,739

(22) Filed: Mar. 30, 2021

(65) Prior Publication Data
US 2021/0371117 A1 Dec. 2, 2021

(30) Foreign Application Priority Data
Apr. 3, 2020 (DE) .................... 10 2020 109 331.4

(51) Int. Cl.
B64D 27/40 (2024.01)
B64C 29/00 (2006.01)
B64D 27/24 (2024.01)

(52) U.S. Cl.
CPC ............. B64D 27/40 (2024.01); B64D 27/24 (2013.01); *B64C 29/0025* (2013.01)

(58) Field of Classification Search
CPC .................... B64C 27/001; B64C 29/0025
See application file for complete search history.

(56) References Cited

U.S. PATENT DOCUMENTS

| | | | |
|---|---|---|---|
| 5,374,011 A | 12/1994 | Lazarus et al. | |
| 8,398,372 B2 | 3/2013 | Lombard et al. | |
| 8,413,923 B2 | 4/2013 | Brenner et al. | |
| 11,124,286 B1* | 9/2021 | Piedmonte | B64C 11/001 |
| 2014/0131510 A1* | 5/2014 | Wang | B64C 27/08 |
| | | | 244/17.23 |
| 2016/0244160 A1* | 8/2016 | Colten | B64C 39/024 |
| 2017/0144751 A1* | 5/2017 | Yu | G03B 15/006 |
| 2018/0327092 A1 | 11/2018 | Deng et al. | |
| 2020/0062377 A1* | 2/2020 | Reichensperger | B64C 27/08 |
| 2020/0324894 A1* | 10/2020 | Fredericks | B64D 27/02 |
| 2020/0346784 A1 | 11/2020 | Guo et al. | |
| 2021/0221501 A1* | 7/2021 | Su | B64U 20/65 |
| 2022/0073205 A1* | 3/2022 | Hertzberg | B64D 1/18 |

FOREIGN PATENT DOCUMENTS

| | | | | |
|---|---|---|---|---|
| EP | 2279359 A1 | 2/2011 | | |
| EP | 3140188 B1 | 12/2018 | | |
| EP | 3581490 A1 | 12/2019 | | |
| FR | 2935350 A1 * | 3/2010 | ............ | B64C 11/48 |
| WO | WO-2009144046 A1 * | 12/2009 | ........... | B64C 27/001 |
| WO | WO 2017184742 A1 | 10/2017 | | |
| WO | WO 2019140640 A1 | 7/2019 | | |
| WO | WO 2020140027 A1 | 7/2020 | | |

* cited by examiner

*Primary Examiner* — Joshua J Michener
*Assistant Examiner* — Arfan Y. Sinaki
(74) *Attorney, Agent, or Firm* — LEYDIG, VOIT & MAYER, LTD.

(57) ABSTRACT

An aircraft includes: a body with an arm. The arm carries a lifting rotor. The arm has a cavity. The aircraft may include at least one of: the arm being made of sheet metal, and the cavity includes an embossment or a corrugation in the sheet metal. The cavity may contain cables and the cables run from the body along the arm to the lifting rotor.

12 Claims, 4 Drawing Sheets

AIRCRAFT WITH ARM HAVING EIGENMODES IN DISJUNCT FREQUENCY RANGES

CROSS-REFERENCE TO PRIOR APPLICATION

Priority is claimed to German Patent Application No. DE 10 2020 109 331.4, filed on Apr. 3, 2020, the entire disclosure of which is hereby incorporated by reference herein.

FIELD

The present invention relates to an aircraft, in particular to an all-electric, vertical takeoff and landing (VTOL) aircraft.

BACKGROUND

VTOL is a global term used in aeronautical and aerospace engineering to denote any kind of aircraft, drone or rocket capable of taking off and landing again substantially vertically without a runway. This collective term is used below in a broad sense that not only includes fixed-wing aircraft with airfoils, but also rotary wing aircraft such as helicopters, gyrocopters, gyroplanes, and hybrids such as compound helicopters or combination helicopters and convertiplanes. Furthermore, aircraft with short takeoff and landing (STOL) capability, short takeoff and vertical landing (STOVL) capability, or vertical takeoff and horizontal landing (VTHL) capability are included.

EP3140188B1 discloses a VTOL having a flight control system configured to provide avionic control of the VTOL in a hover mode and in level-flight mode, a body which encapsulates the engine and the flight control system and is configured in a flying-wing arrangement, a propeller disk located at front of the VTOL which is coupled to the engine and configured to provide vertical thrust in hover mode and horizontal thrust for flying in level-flight mode, and a pair of contra-rotating propellers fixed along the central axis of the body, and a plurality of retractable wings which are foldably coupled to the body and are each configured to be located on the side of the body in hover mode and to be extended in level-flight mode, in order to provide aerodynamic lift.

In the field of aeroelasticity and flight control, the self-induced vibration of an aircraft is generally referred to as flutter. Basically all parts or masses of the aircraft are involved in this vibration; it is influenced by the rigid degrees of freedom, in other words translation and rotation, in conjunction with the elastic deformation of the aircraft, the mass distribution thereof, and transient air forces at the vibrating aerodynamic surfaces.

Structural measures intended to reduce flutter or increase the threshold speed at which incipient flutter restricts the safe operational range of the aircraft are known in the art. Since flutter usually leads to the breakage of the component concerned and, consequently, causes the aircraft to crash, special attention is paid to this phenomenon during the design phase.

Targeted adjustment of the dynamic vibration response presents developers with major challenges, in particular when an aircraft has arms to which drive units—e.g. engines with propellers—are fastened. Symmetrical tubular profiles with usually internal cabling which is very difficult to access are known in the art, for example.

According to the prior art, by reducing the hollow cross-sectional area of arms of this kind enclosed by the profile center line—for example by adjusting the outer diameter or wall thickness—the polar moment of inertia thereof can be reduced and therefore the torsional mode reduced or adjusted in some other way.

SUMMARY

In an embodiment, the present invention provides an aircraft, comprising: a body with an arm, wherein the arm carries a lifting rotor, and wherein the arm has a cavity.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
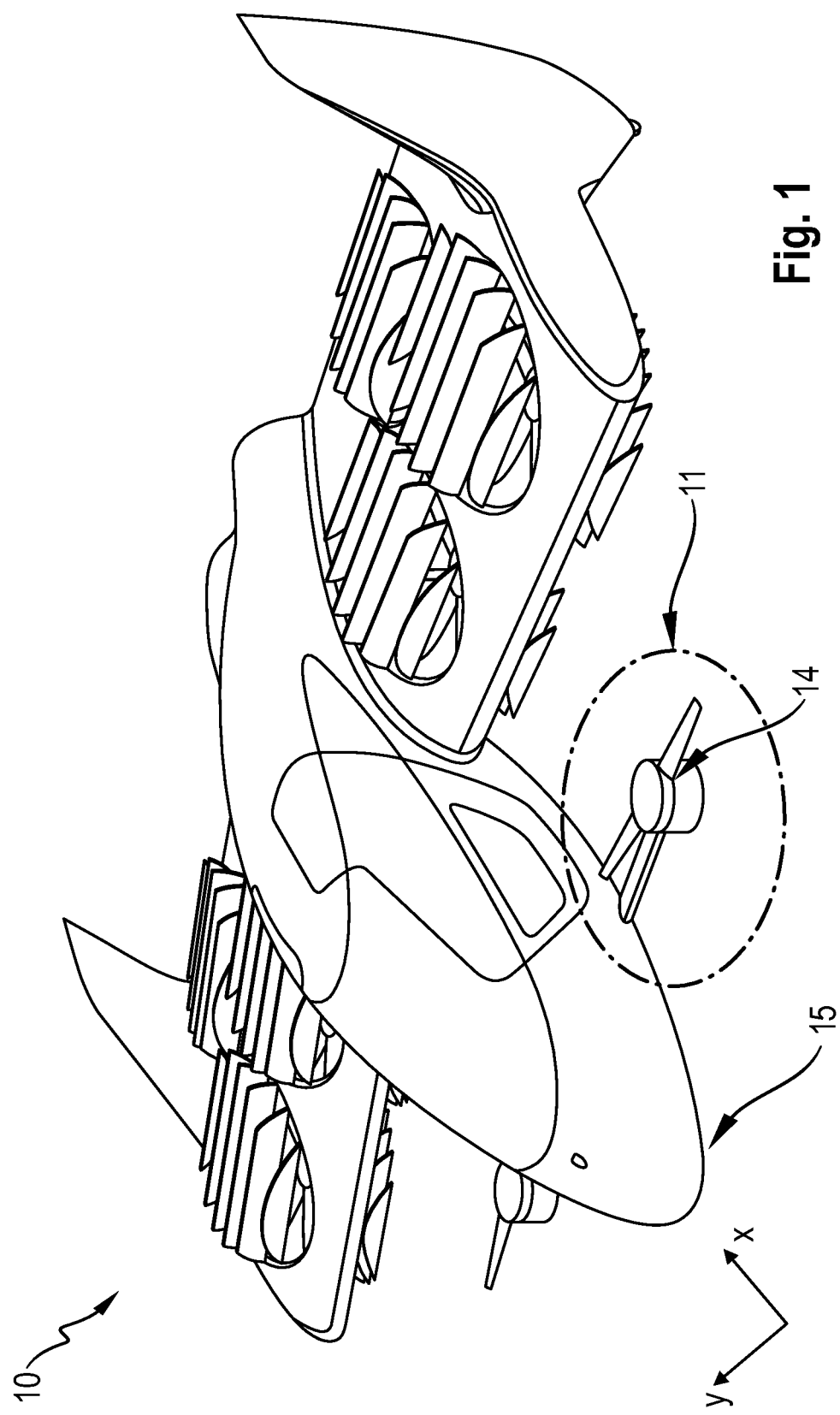
FIG. 1 shows the perspective view of an aircraft.

In an embodiment, the present invention provides an aircraft, in particular to an all-electric aircraft with vertical takeoff and landing capability as described above.

The approach taken according to the invention is based on the knowledge that flutter occurs when a vibration mode resonates with a second approximately or equally frequent vibration mode—for example a bending mode and a torsional mode—and these vibrations are structurally overlaid. Natural frequencies of this kind are basically structurally related and are stimulated to different degrees depending on, for example, the flying speed. Free flight propellers or lifting rotors supported by arms, in particular, may in addition be induced to flutter by precession forces.

One advantage of the invention is the increased functional safety of the aircraft in a whole host of different flying situations, for example those characterized by different propeller speeds and wind directions. For this purpose, it combines the essential requirements of structural strength—so to guard against misuse, for example—and robust design of the vibration response. Even with structural limitations in terms of the outer dimensions, wall thickness, etc. which may be imposed on the design engineer through design, strength or weight specifications, for example, a design of this kind is made possible through the introduction according to the invention of a functional corrugation or embossment in observance of the specifications.

In this way, component resonances can be selectively moved into uncritical frequency ranges in which there is no permanent inducement by engines, airflows, etc. during operation. Because any inducement of these structures at their resonance frequency is structurally prevented, premature fatigue or even failure of individual components is avoided.

Further advantageous embodiments of the invention are described herein. Hence, the high safety requirements made of aircraft can be taken into account by installing cables in the cavity of the arm for ease of maintenance.

In a preferred embodiment, this cavity is located on the underside of the arm. This means that the cables can be largely protected from outside influences such as direct sunlight or inducement by wind or an oncoming airflow while cruising.

Furthermore, the aircraft may be fitted with airfoils that are bent down or are even capable of being optionally bent down. A corresponding variant enlarges the effective wing area during level flight but without substantially increasing the aircraft's footprint.

In addition, the aircraft may have a rapidly chargeable battery system which provides the drive energy for vertical takeoff and landing and for level flight and allows short-term charging of the aircraft while standing.

In order to drive the aircraft, rather than free flight rotors, multiple ducted fans, including of different sizes, can be used in this case, as are known from hovercrafts or airboats away from aviation technology, for example. The cylindrical housing surrounding the propeller may substantially reduce the thrust losses resulting from turbulence at the leaf tips in an embodiment of this kind. Suitable ducted fans may be oriented horizontally or vertically, configured pivotably between two positions or, for aerodynamic reasons, covered with louvers in level flight. In addition, a pure horizontal thrust generation by means of fixed ducted fans is conceivable.

Finally, apart from a preferably fully autonomous operation of the aircraft, giving manual control to the human pilot is also a possibility, provided they are sufficiently qualified, and this confers the greatest possible flexibility in terms of handling to the device according to the invention.

FIG. 1 illustrates the structural features of a preferred embodiment of the aircraft (10) according to the invention. Arms (11) which project from the body in opposite directions to one another parallel to the pitch axis and each support a lifting rotor (14) are screwed to the nose (15) of said aircraft.

Figure 2:
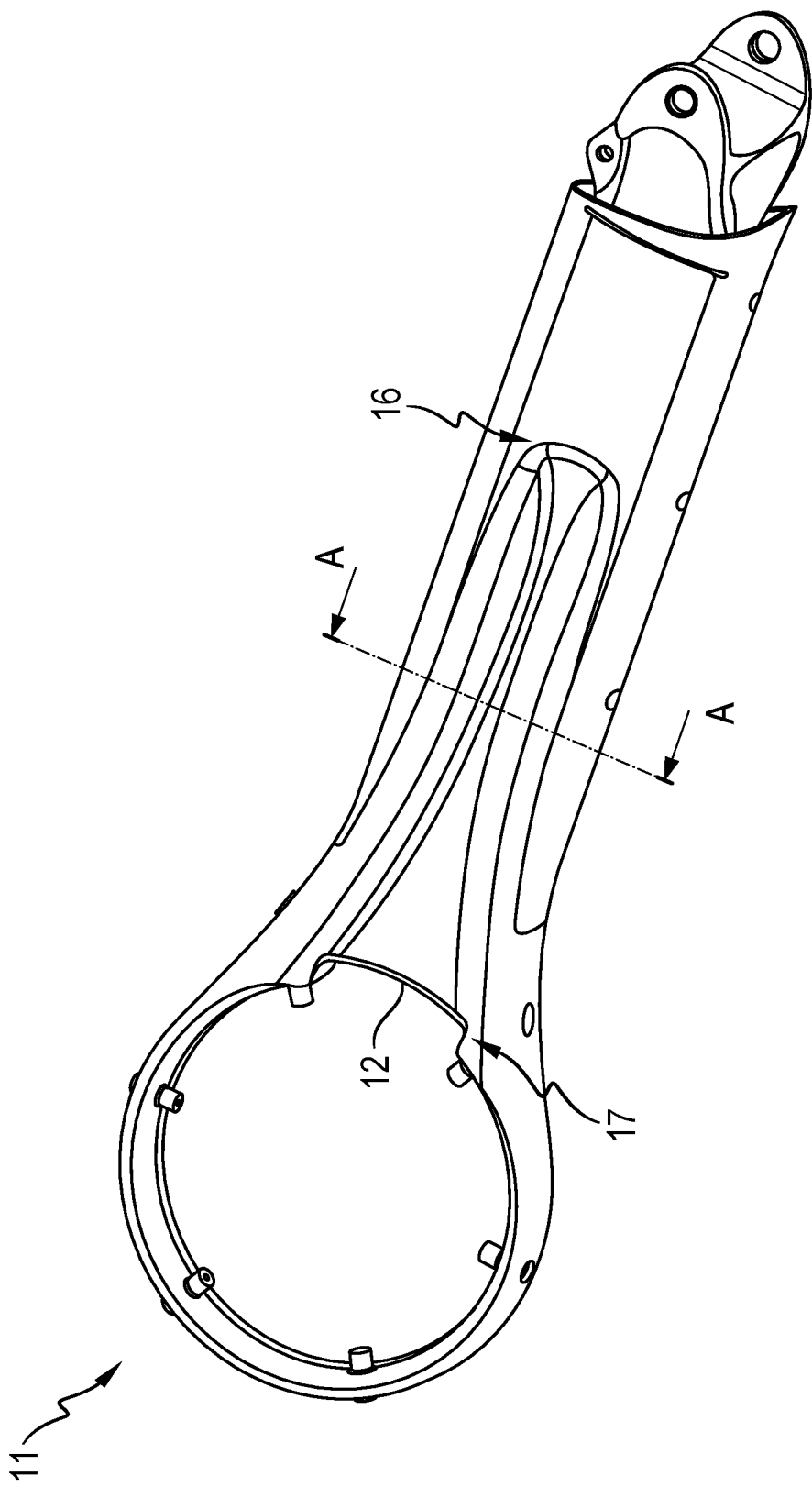
FIG. 2 shows the view of an arm from below.
Figure 4:
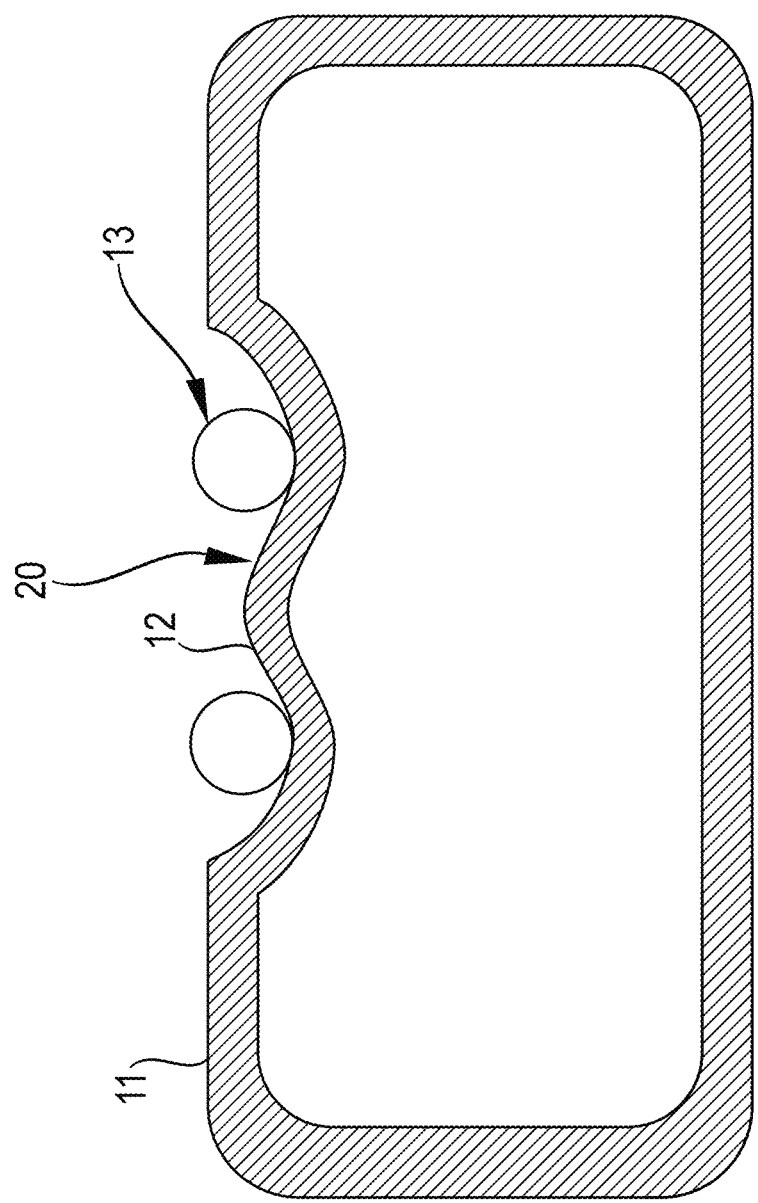
FIG. 4 shows the section of FIG. 3 with a cavity including a corrugation.

As can be seen from FIG. 2, the arm (11) made of sheet metal in the present exemplary embodiment has a cavity (12) comprising an embossment on the underside. It is self-evident that, in an alternative embodiment, for example a corrugation (20) (as illustrated in FIG. 4) or some other cavity (12) may be provided instead, without departing from the scope of the invention. The cavity 12 includes a first axial end 16 and a second axial end 17. As described above, the arm (11) is screwed to the nose of the aircraft, and the first axial end (16) is thus arranged closer to or proximal to the body of the aircraft relative to the second axial end (17), which is arranged further from or distal to the body of the aircraft. A width of the cavity (12) at the second axial end (17) is greater than a width of the cavity (12) at the first axial end (16). The cavity (12) extends more than halfway along the axial length of the arm (11). The cavity (12) has a varying width from the first axial end (16) to the second axial end (17). Along at least part of an axial extent of the cavity (12) from the first axial end (16) to the second axial end (17), the cavity (12) gradually narrows. Along at least part of the axial extent of the cavity (12) from the first axial end (16) to the second axial end (17), the cavity (12) also gradually widens.

Figure 3:
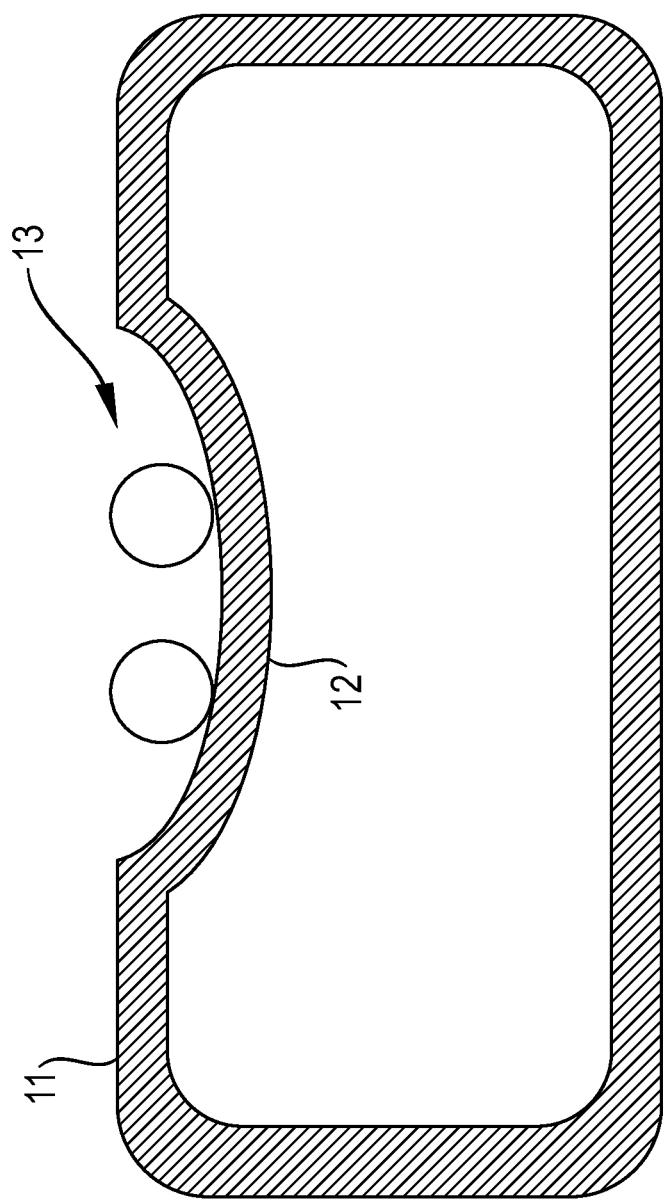
FIG. 3 shows a section through the arm along the plane A-A according to FIG. 2.

FIG. 3 highlights the closed hollow cross section of the thin-walled arm (11). By introducing the cavity (12) on the underside, the torsional frequency can be adjusted without the bending modes being noticeably affected in relation to the X and Z axis. The cavity (12) gives the arm (11) a robust dynamic design for eigenmodes, for example, in disjunct frequency ranges of 10-15 Hz (bend in relation to the Z axis), 25-30 Hz (bend in relation to the X axis), 70-85 Hz (torsion in relation to the Y axis) and 200-210 Hz (longitudinally to the Y axis of the aircraft coordinate system).

The cavity (12) on the underside also allows two control and power lines (13) for the supply and control of the engines to be installed in position protected from the wind. Neither the vertical airflow nor the airflow in forwards flight induces these cables (13), which means there is a reduced risk of cable breakage.

The wind-protected placement also means that an additional cover, as would be required if the cables were to be laid along the side of the arm (11), can be dispensed with. The cables (13) can therefore be reached very easily and quickly if they need to be checked or replaced.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An aircraft, comprising:
   a body with an arm,
   wherein the arm carries a lifting rotor,
   wherein an underside of the arm has an externally facing concave cavity extending along an axial length of the arm and along a center of the underside of the arm,
   wherein the cavity has a first axial end and a second axial end, the first axial end being proximal to the body and the second axial end being distal to the body,
   wherein the arm includes a point of attachment by which the arm is configured to be attached to the body,
   wherein the first axial end of the cavity is axially offset from the point of attachment along the axial length of the arm, and
   wherein a width of the cavity at the second axial end is greater than a width of the cavity at the first axial end.

2. The aircraft of claim 1, wherein:
   the arm comprises sheet metal, and
   the cavity comprises an embossment or a corrugation in the sheet metal.

3. The aircraft of claim 1, wherein the cavity contains cables, and
wherein the cables run from the body along the arm to the lifting rotor.

4. The aircraft of claim 3, wherein the cables enclose control lines.

5. The aircraft of claim 1, wherein the arm has eigenmodes in disjunct frequency ranges.

6. The aircraft of claim 1, wherein the arm has a closed hollow cross section.

7. The aircraft of claim 1, wherein the arm is arranged at a nose end of the body.

8. The aircraft of claim 1, wherein the cavity extends more than halfway along the axial length of the arm.

9. The aircraft of claim 1, wherein the cavity has a varying width from the first axial end to the second axial end.

10. The aircraft of claim 9, wherein along at least part of an axial extent of the cavity from the first axial end to the second axial end, the cavity gradually narrows.

11. The aircraft of claim 10, wherein along at least part of the axial extent of the cavity from the first axial end to the second axial end, the cavity also gradually widens.

12. An aircraft, comprising:
a body;
an arm; and
a lifting rotor,
wherein the arm is attached to the body and carries a lifting rotor,
wherein an underside of the arm has an externally facing concave cavity extending along an axial length of the arm and along a center of the underside of the arm,
wherein the cavity has a first axial end and a second axial end, the first axial end being proximal to the body relative to the second axial end from a point of attachment of the arm to the body and the second axial end being distal to the body relative to the first axial end from the point of attachment of the arm to the body,
wherein the first axial end of the cavity is axially offset from the point of attachment along the axial length of the arm, and
wherein a width of the cavity at the second axial end is greater than a width of the cavity at the first axial end.

* * * * *